(12) United States Patent
Seo et al.

(10) Patent No.: US 10,696,304 B2
(45) Date of Patent: Jun. 30, 2020

(54) VEHICLE AND METHOD FOR CONTROLLING SPEED THEREOF

(71) Applicants: Hyundai Motor Company, Seoul (KR); Kia Motors Corporation, Seoul (KR)

(72) Inventors: Gil Won Seo, Hwaseong-si (KR); Wan Seok Yang, Seoul (KR); Dong Hae Kim, Jeonju-si (KR); Jong Ho Park, Incheon (KR); Chan Hee Jung, Anyang-si (KR); Dae Joong Yoon, Hwaseong-si (KR); Ki Ho Lee, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 202 days.

(21) Appl. No.: 15/983,761

(22) Filed: May 18, 2018

(65) Prior Publication Data
US 2019/0185000 A1   Jun. 20, 2019

(30) Foreign Application Priority Data
Dec. 15, 2017   (KR) .................... 10-2017-0173212

(51) Int. Cl.
*B60W 10/18*   (2012.01)
*B60W 30/18*   (2012.01)
*B60W 10/02*   (2006.01)

(52) U.S. Cl.
CPC ........ *B60W 30/1819* (2013.01); *B60W 10/02* (2013.01); *B60W 10/18* (2013.01); *B60W 2510/0275* (2013.01); *B60W 2520/10* (2013.01); *B60W 2552/15* (2020.02); *B60W 2710/027* (2013.01); *B60W 2710/182* (2013.01); *B60W 2720/10* (2013.01)

(58) Field of Classification Search
None
See application file for complete search history.

(56) References Cited

U.S. PATENT DOCUMENTS

| | | | |
|---|---|---|---|
| 4,931,930 A * | 6/1990 | Shyu ...................... | B60Q 9/007 180/167 |
| 2002/0132702 A1* | 9/2002 | Muramoto ................ | B60T 7/12 477/183 |
| 2016/0114787 A1* | 4/2016 | Yang .................... | B60W 10/113 701/22 |
| 2016/0297445 A1* | 10/2016 | Bjernetun ....... | B60W 30/18072 |
| 2017/0021828 A1 | 1/2017 | Seo et al. | |
| 2017/0050634 A1* | 2/2017 | Kang .................... | B60W 20/30 |
| 2017/0072960 A1* | 3/2017 | Huh ...................... | B60W 10/08 |

FOREIGN PATENT DOCUMENTS

KR   2017-0011150 A   2/2017

* cited by examiner

*Primary Examiner* — Justin Holmes
(74) *Attorney, Agent, or Firm* — Morgan, Lewis & Bockius LLP (57) ABSTRACT

A vehicle may include a dual clutch transmission that adjusts a travel speed of the vehicle based on clutch torque, a brake that makes the vehicle slow down to reduce the travel speed of the vehicle, and a controller that sets a target speed of the vehicle and controls the dual clutch transmission and the brake to allow the travel speed of the vehicle to follow the set target speed.

18 Claims, 9 Drawing Sheets

VEHICLE AND METHOD FOR CONTROLLING SPEED THEREOF

CROSS-REFERENCE TO RELATED APPLICATION

The present application claims priority to Korean Patent Application No. 10-2017-0173212, filed on Dec. 15, 2017, the entire contents of which is incorporated herein for all purposes by this reference.

BACKGROUND OF THE INVENTION

Field of the Invention

The present invention relates to a vehicle and a method for controlling a speed thereof, and more particularly, to a vehicle and a method for controlling a speed thereof during an autonomous parking operation.

Description of Related Art

In a vehicle having an automatic transmission of a fluid torque converter type, an engine torque is transmitted through hydraulic fluid. Accordingly, first speed stage engagement is possible even when the vehicle stops or travels at an extremely low speed (0 to 4 kph) so that stable engine start and sufficient torque can be achieved, which enables efficient vehicle speed control during an autonomous parking operation of the vehicle.

In contrast, in a vehicle to which a dual clutch transmission (DCT) is applied, half clutch may continue at an extremely low speed due to clutch control using direct friction. Accordingly, frictional heat of the clutch may rapidly increase, and engine start may be unstable if the clutch is completely engaged when the vehicle stops or travels at a low speed.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle for reducing heat generated by a dual clutch and a method for controlling a speed thereof.

The technical problems to be solved by the present invention are not limited to the aforementioned problems, and any other technical problems not mentioned herein will be clearly understood from the following description by those skilled in the art to which the present invention pertains.

According to various aspects of the present invention, a vehicle may include a dual clutch transmission that adjusts a travel speed of the vehicle based on clutch torque, a brake that makes the vehicle slow down to reduce the travel speed of the vehicle, and a controller that sets a target speed of the vehicle and controls the dual clutch transmission and the brake to allow the travel speed of the vehicle to follow the set target speed.

In various aspects of the present invention, the target speed may be defined as a speed which is lower than a creep driving speed of the vehicle.

In various aspects of the present invention, the controller may be configured to control the dual clutch transmission to increase the clutch torque when the travel speed of the vehicle is lower than the target speed and may control the dual clutch transmission to decrease the clutch torque when the travel speed of the vehicle is higher than or equal to the target speed.

In various aspects of the present invention, the brake may adjust brake pressure to make the vehicle slow down.

In various aspects of the present invention, the controller may be configured to control the brake to decrease the brake pressure by a first level when the travel speed of the vehicle is lower than the target speed and may control the brake to increase the brake pressure by a second level when the travel speed of the vehicle is higher than or equal to the target speed.

In various aspects of the present invention, the controller may be configured to control the brake to decrease the brake pressure by a third level lower than the first level when the travel speed of the vehicle is lower than the target speed while the vehicle is located on a downwardly inclined section.

In various aspects of the present invention, the controller may be configured to control the dual clutch transmission to generate a first additional torque when the vehicle is located on an upwardly inclined section.

In various aspects of the present invention, the controller may be configured to control the brake to decrease the brake pressure until the clutch torque increases to reach the first additional torque or more when the vehicle is located on the upwardly inclined section and may control the brake to release the brake pressure when the clutch torque is greater than or equal to the first additional torque.

In various aspects of the present invention, the controller may be configured to control the dual clutch transmission to decrease the clutch torque and may control the brake to increase the brake pressure when the target speed of the vehicle is set to zero.

In various aspects of the present invention, the controller may be configured to control the dual clutch transmission to generate a second additional torque when the travel speed of the vehicle decreases in a section where the clutch torque is greater than or equal to a predetermined value.

According to various aspects of the present invention, a method for controlling a speed of a vehicle may include setting a target speed of the vehicle and controlling a dual clutch transmission and a brake to allow a travel speed of the vehicle to follow the target speed, based on the set target speed.

In various aspects of the present invention, the target speed may be defined as a speed which is lower than a creep driving speed of the vehicle.

In various aspects of the present invention, the controlling of the dual clutch transmission and the brake may include controlling the dual clutch transmission to increase the clutch torque when the travel speed of the vehicle is lower than the target speed and controlling the dual clutch transmission to decrease the clutch torque when the travel speed of the vehicle is higher than or equal to the target speed.

In various aspects of the present invention, the brake may adjust brake pressure to make the vehicle slow down.

In various aspects of the present invention, the controlling of the dual clutch transmission and the brake may further include controlling the brake to decrease the brake pressure by a first level when the travel speed of the vehicle is lower than the target speed and controlling the brake to increase the brake pressure by a second level when the travel speed of the vehicle is higher than or equal to the target speed.

In various aspects of the present invention, the controlling of the dual clutch transmission and the brake may further include controlling the brake to decrease the brake pressure by a third level lower than the first level when the travel speed of the vehicle is lower than the target speed while the vehicle is located on a downwardly inclined section.

In various aspects of the present invention, the controlling of the dual clutch transmission and the brake may include controlling the dual clutch transmission to generate a first additional torque when the vehicle is located on an upwardly inclined section.

In various aspects of the present invention, the controlling of the dual clutch transmission and the brake may further include controlling the brake to decrease the brake pressure until the clutch torque increases to reach the first additional torque or more when the vehicle is located on the upwardly inclined section and controlling the brake to release the brake pressure when the clutch torque is greater than or equal to the first additional torque.

In various aspects of the present invention, the controlling of the dual clutch transmission and the brake may include controlling the dual clutch transmission to decrease the clutch torque and controlling the brake to increase the brake pressure when the target speed of the vehicle is set to zero.

In various aspects of the present invention, the controlling of the dual clutch transmission and the brake may include controlling the dual clutch transmission to generate a second additional torque when the travel speed of the vehicle decreases in a section where the clutch torque is greater than or equal to a predetermined value.

A vehicle and a method for controlling a speed thereof, In various aspects of the present invention, may reduce heat generated by a dual clutch.

A vehicle and a method for controlling a speed thereof, In various aspects of the present invention, may cooperatively control a dual clutch transmission and a brake, facilitating efficient speed control during an autonomous parking operation.

A vehicle and a method for controlling a speed thereof, In various aspects of the present invention, may improve merchantability of a vehicle having an autonomous parking function.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the contrary, the invention(s) is/are intended to cover not only the exemplary embodiments of the present invention, but also various alternatives, modifications, equivalents and other embodiments, which may be included within the spirit and scope of the invention as defined by the appended claims.

Hereinafter, various exemplary embodiments of the present invention will be described more specifically with reference to the accompanying drawings. In the drawings, the same reference numerals will be used throughout to designate the same or equivalent elements. Furthermore, a detailed description of well-known features or functions will be ruled out in order not to unnecessarily obscure the gist of the present invention.

Terms, such as "first", "second", "A", "B", "(a)", "(b)", and the like, may be used herein to describe elements of the present invention. Such terms are only used to distinguish one element from another element, and the substance, sequence, order, or number of these elements is not limited by these terms. Unless otherwise defined, all terms used herein, including technical and scientific terms, have the same meaning as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
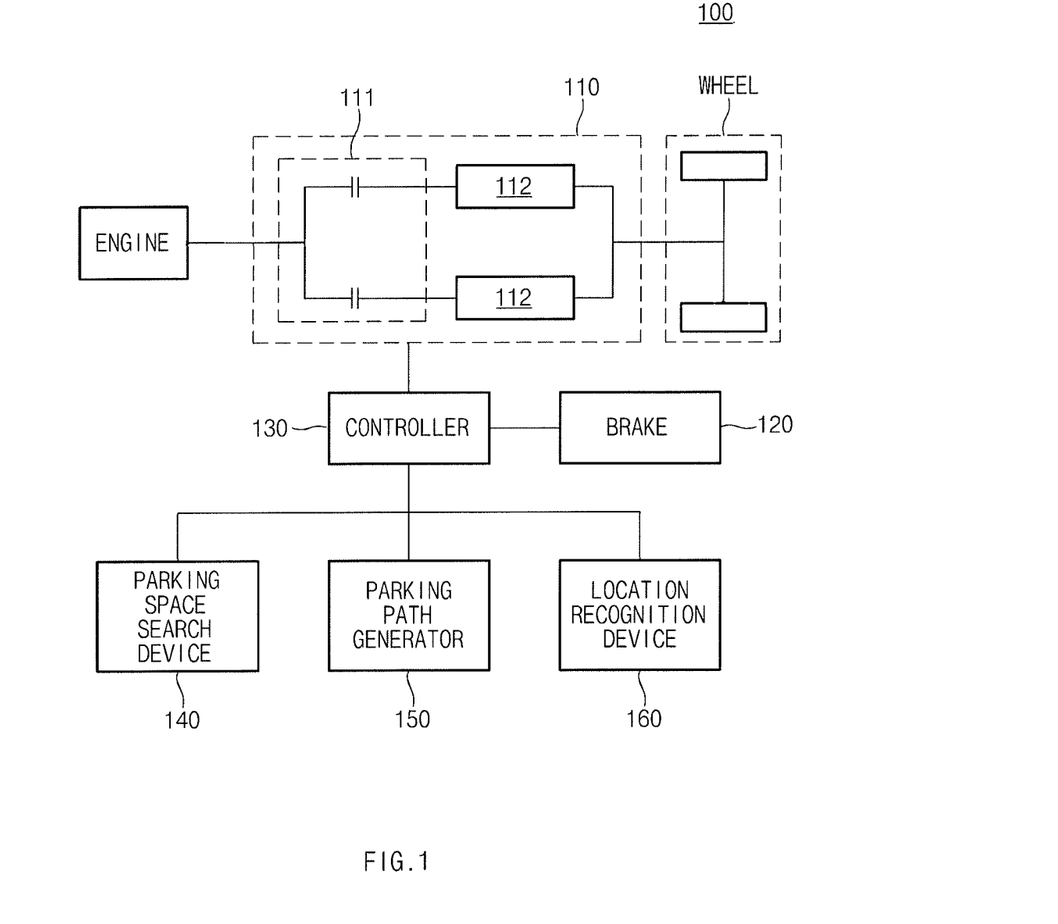
FIG. 1 illustrates a vehicle according to an exemplary embodiment of the present invention.
Figure 2:
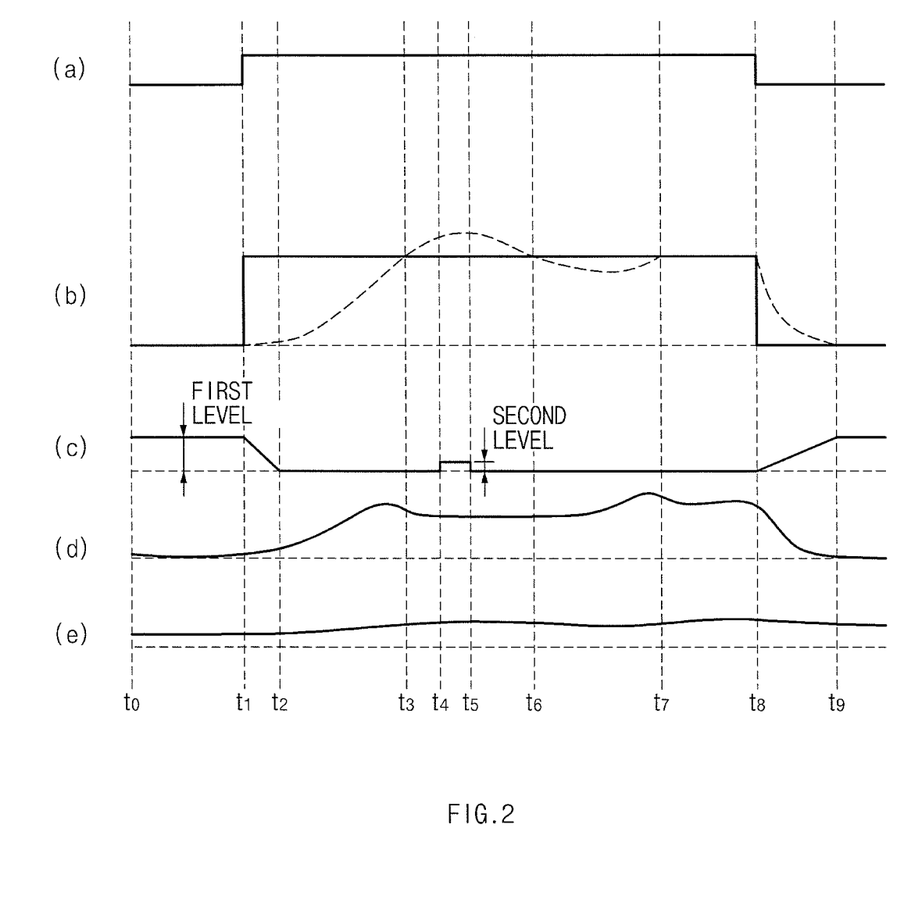
FIG. 2 illustrates a graph for explaining an operation of controlling the speed of the vehicle when the vehicle is located on a flat section, according to an exemplary embodiment of the present invention.
Figure 3:
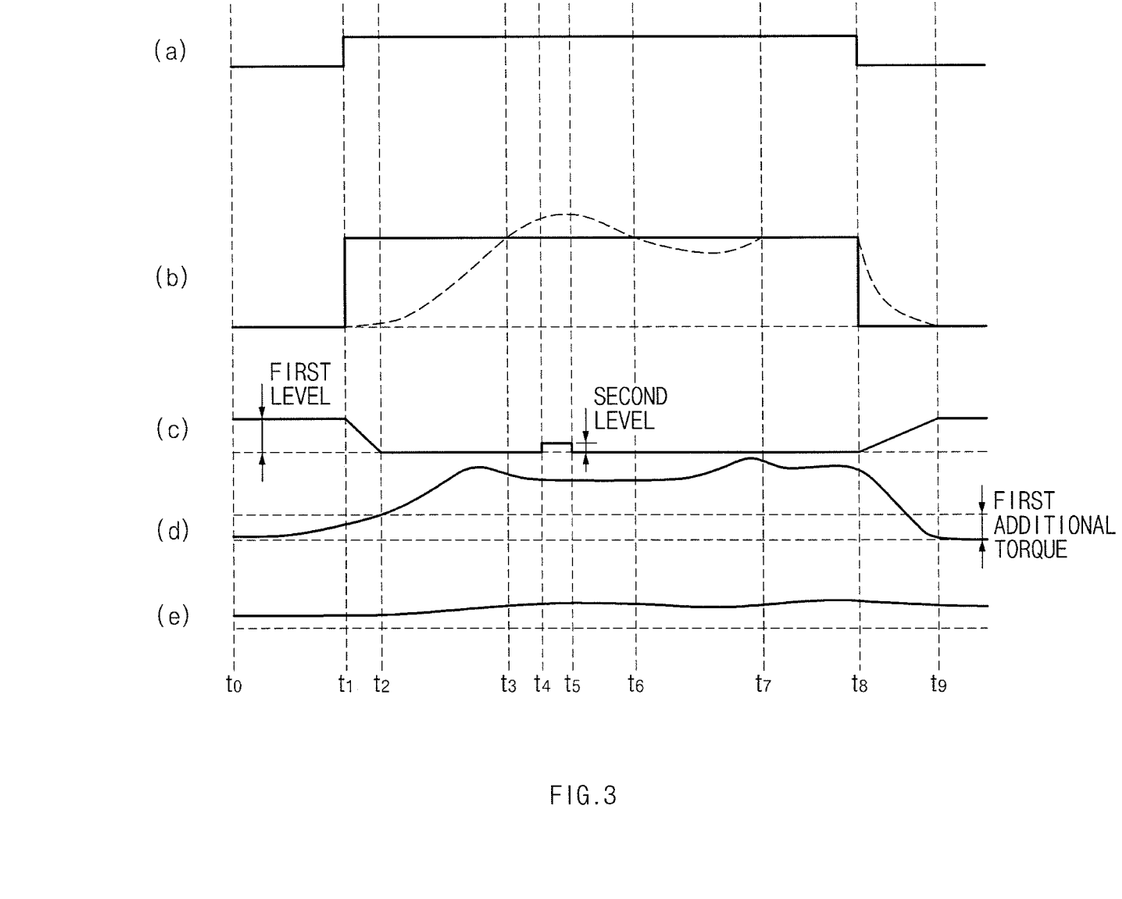
FIG. 3 illustrates a graph for explaining an operation of controlling the speed of the vehicle when the vehicle is located on an upwardly inclined section, according to an exemplary embodiment of the present invention.
Figure 4:
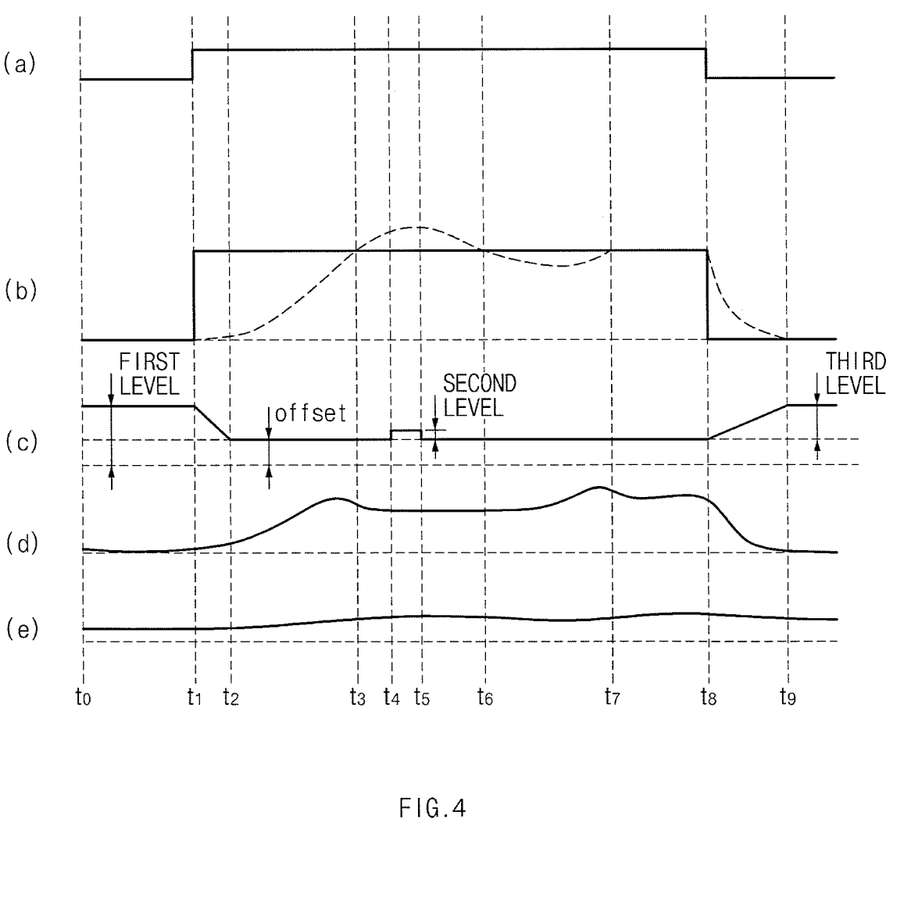
FIG. 4 illustrates a graph for explaining an operation of controlling the speed of the vehicle when the vehicle is located on a downwardly inclined section, according to an exemplary embodiment of the present invention.

FIG. 1 illustrates a vehicle according to an exemplary embodiment of the present invention. FIG. 2 illustrates a graph for explaining an operation of controlling the speed of the vehicle when the vehicle is located on a flat section, according to an exemplary embodiment of the present invention. FIG. 3 illustrates a graph for explaining an operation of controlling the speed of the vehicle when the vehicle is located on an upwardly inclined section, according to an exemplary embodiment of the present invention. FIG. 4 illustrates a graph for explaining an operation of controlling the speed of the vehicle when the vehicle is located on a downwardly inclined section, according to an exemplary embodiment of the present invention.

Referring to FIG. 1, a vehicle 100 according to an exemplary embodiment of the present invention may include a dual clutch transmission 110, a brake 120, a controller 130, a parking space search device 140, a parking path generator 150, and a location recognition device 160.

The dual clutch transmission 110 may include a dual clutch 111 and gearboxes 112. The dual clutch transmission 110 may engage or disengage an engine and vehicle wheels, depending on whether the dual clutch 111 is engaged or not. For example, a driving force of the engine may be directly transmitted to the wheels through the gearboxes 112 when the dual clutch 111 is engaged, and may not be transmitted to the wheels when the dual clutch 111 is disengaged.

The dual clutch transmission 110 may adjust a travel speed of the vehicle, based on clutch torque. The dual clutch transmission 110 may control the clutch torque in a response to control of the controller 130 to adjust the driving force of the engine which is transmitted to the wheels of the vehicle 100. For example, the dual clutch transmission 110 may control the clutch torque to allow the vehicle travel speed to follow a target speed set by the controller 130.

The brake 120 may make the vehicle 100 slow down to reduce the travel speed of the vehicle 100. For example, the brake 120 may adjust brake pressure to make the vehicle 100 slow down.

The controller 130 may control driving of the vehicle 100 and may control an overall operation of elements inside the vehicle 100. For example, the controller 130 may control an autonomous parking operation of the vehicle 100. The controller 130 may control the autonomous parking operation of the vehicle 100 when a command to start the autonomous parking operation is received from a user. The controller 130 may control the autonomous parking operation of the vehicle 100 by use of parking path information generated by the parking path generator 150, based on parking space information found by the parking space search device 140 and the current location of the vehicle 100 which is identified by the location recognition device 160.

The controller 130 may set a target speed of the vehicle 100 during the autonomous parking operation of the vehicle 100. The controller 130 may control the dual clutch transmission 110 and the brake 120 to allow the travel speed of the vehicle 100 during the autonomous parking operation to follow the set target speed. Here, the target speed may be defined as a speed which is lower than a creep driving speed of the vehicle 100.

The controller 130 may determine whether the vehicle 100 is located on a flat section, an upwardly inclined section, or a downwardly inclined section, based on the current location of the vehicle 100 which is identified by the location recognition device 160, and may control the dual clutch transmission 110 and the brake 120 in a response to the determined section. Alternatively, the controller 130 may determine whether the vehicle 100 is located on a flat section, an upwardly inclined section, or a downwardly inclined section, by use of detection information obtained through various detectors of the vehicle 100.

For example, referring to FIG. 2, when the vehicle 100 is located on a flat section, the controller 130 may control the dual clutch transmission 110 and the brake 120 to allow the travel speed of the vehicle 100 to follow a target speed.

FIG. 2 (a) illustrates that a command to start an autonomous parking operation is received from a user over a time interval from t1 to t8. In FIG. 2 (b), the solid line shows the target speed of the vehicle 100, and the dotted line shows a change in the travel speed of the vehicle 100. FIG. 2 (c) illustrates a change in brake pressure of the brake 120, FIG. 2 (d) illustrates a change in clutch torque, and FIG. 2 (e) illustrates a change in the temperature of the clutch.

Over a first time interval from t0 to t1, the vehicle 100 is controlled to remain in a stop state. Accordingly, over the first time interval, the clutch torque may be controlled substantially close to zero, and the brake pressure may be controlled to a first level. Over a second time interval from t1 to t2, the controller 130 may set the target speed and may control the dual clutch transmission 110 and the brake 120 to allow the travel speed of the vehicle 100 to follow the target speed, in a response to the command to start the autonomous parking operation, which is received from the user.

The controller 130 may control the dual clutch transmission 110 to increase the clutch torque when the travel speed of the vehicle 100 is lower than the target speed and may control the dual clutch transmission 110 to decrease the clutch torque when the travel speed of the vehicle 100 is higher than or equal to the target speed. For example, the controller 130 may control the dual clutch transmission 110 to increase the clutch torque and may control the brake 120 to decrease the brake pressure by the first level.

Over a third time interval from t2 to t3, the controller 130 may control the brake 120 to release the brake pressure. For example, the release of the brake pressure may refer to controlling the brake pressure to zero. Furthermore, the controller 130 may control the dual clutch transmission 110 to increase the clutch torque and may then control the dual clutch transmission 110 to decrease the clutch torque if a difference between the travel speed of the vehicle 100 and the target speed is less than a threshold value.

Over a fourth time interval from t3 to t4, the travel speed of the vehicle 100 may exceed the target speed. Over a fifth time interval from t4 to t5, the controller 130 may control the brake 120 to increase the brake pressure by a second level. Here, the second level may be defined as a value which is less than the first level, but the second level is not limited thereto. Accordingly, over a sixth time interval from t5 to t6, the travel speed of the vehicle 100 may decrease.

Over a seventh time interval from t6 to t7, the travel speed of the vehicle 100 may decrease below the target speed again. In the instant case, the controller 130 may control the dual clutch transmission 110 to increase the clutch torque and may then control the dual clutch transmission 110 to decrease the clutch torque if a difference between the travel speed of the vehicle 100 and the target speed is less than the threshold value.

Over an eighth time interval from t7 to t8, the travel speed of the vehicle 100 may be the same as or substantially the same as the target speed. Over a ninth time interval from t8 to t9, the controller 130 may control the dual clutch transmission 110 to decrease the clutch torque and may control the brake 120 to increase the brake pressure, in the case where the target speed of the vehicle 100 is set to zero (e.g., in the case where the vehicle 100 is completely parked and stopped). For example, to reduce the travel speed of the vehicle 100, the controller 130 may control the brake 120 to increase the brake pressure by the first level and may control the dual clutch transmission 110 to release the clutch torque (that is, to adjust the clutch torque to zero). Furthermore, the controller 130 may release the clutch torque when the vehicle 100 stops (that is, when the travel speed of the vehicle 100 is reduced to zero). For example, the release of the clutch torque may refer to controlling the clutch torque to zero.

As described above, the controller 130 may control the dual clutch transmission 110 and the brake 120 to allow the travel speed of the vehicle 100 to follow the target speed, controlling the clutch torque within a predetermined range, and therefore a significant temperature change of the clutch may not be caused by friction with the engine. A specific description thereabout will be provided below.

Referring to FIG. 3, when the vehicle 100 is located on an upwardly inclined section, the controller 130 may control the dual clutch transmission 110 and the brake 120 to allow the travel speed of the vehicle 100 to follow a target speed. For example, the controller 130 may control the dual clutch transmission 110 to generate a first additional torque when the vehicle 100 is located on the upwardly inclined section. The aim is to control the travel speed of the vehicle 100 to follow the target speed, in view of the fact that when the vehicle 100 is located on the upwardly inclined section, greater clutch torque is required to follow the same target speed than when the vehicle 100 is located on a flat section.

FIG. 3 (a) illustrates that a command to start an autonomous parking operation is received from a user over a time interval from t1 to t8. In FIG. 3 (b), the solid line shows the target speed of the vehicle 100, and the dotted line shows a change in the travel speed of the vehicle 100. FIG. 3 (c) illustrates a change in brake pressure of the brake 120, FIG. 3 (d) illustrates a change in clutch torque, and FIG. 3 (e) illustrates a change in the temperature of the clutch.

Over a first time interval from t0 to t1, the vehicle 100 is controlled to remain in a stop state. Accordingly, over the first time interval, the clutch torque may be controlled substantially close to zero, and the brake pressure may be controlled to a first level. Over a second time interval from t1 to t2, the controller 130 may set the target speed and may control the dual clutch transmission 110 and the brake 120 to allow the travel speed of the vehicle 100 to follow the target speed, in a response to the command to start the autonomous parking operation, which is received from the user.

The controller 130 may control the dual clutch transmission 110 to increase the clutch torque when the travel speed of the vehicle 100 is lower than the target speed and may control the dual clutch transmission 110 to decrease the clutch torque when the travel speed of the vehicle 100 is higher than or equal to the target speed. For example, the controller 130 may control the dual clutch transmission 110 to increase the clutch torque and may control the brake 120 to decrease the brake pressure by the first level.

Over a third time interval from t2 to t3, the controller 130 may control the brake 120 to release the brake pressure when the clutch torque is greater than or equal to the first additional torque. Here, the first additional torque may refer to an amount of torque for compensating for a reduction in the travel speed of the vehicle due to the upward slope. Furthermore, the controller 130 may control the dual clutch transmission 110 to increase the clutch torque and may then control the dual clutch transmission 110 to decrease the clutch torque if a difference between the travel speed of the vehicle 100 and the target speed is less than a threshold value.

Over a fourth time interval from t3 to t4, the travel speed of the vehicle 100 may exceed the target speed. Over a fifth time interval from t4 to t5, the controller 130 may control the brake 120 to increase the brake pressure by a second level. Accordingly, over a sixth time interval from t5 to t6, the travel speed of the vehicle 100 may decrease.

Over a seventh time interval from t6 to t7, the travel speed of the vehicle 100 may decrease below the target speed again. In the instant case, the controller 130 may control the dual clutch transmission 110 to increase the clutch torque and may then control the dual clutch transmission 110 to decrease the clutch torque if a difference between the travel speed of the vehicle 100 and the target speed is less than the threshold value.

Over an eighth time interval from t7 to t8, the travel speed of the vehicle 100 may be the same as or substantially the same as the target speed. Over a ninth time interval from t8 to t9, the controller 130 may control the dual clutch transmission 110 to decrease the clutch torque and may control the brake 120 to increase the brake pressure, in the case where the target speed of the vehicle 100 is set to zero (e.g., in the case where the vehicle 100 is completely parked and stopped). For example, to reduce the travel speed of the vehicle 100, the controller 130 may control the brake 120 to increase the brake pressure by the first level and may control the dual clutch transmission 110 to release the clutch torque (that is, to adjust the clutch torque to zero). Furthermore, the controller 130 may release the clutch torque when the vehicle 100 stops (that is, when the travel speed of the vehicle 100 is reduced to zero).

Referring to FIG. 4, when the vehicle 100 is located on a downwardly inclined section, the controller 130 may control the dual clutch transmission 110 and the brake 120 to allow the travel speed of the vehicle 100 to follow a target speed. For example, the controller 130 may control the brake 120 to decrease brake pressure by a third level which is lower than the first level, in the case where the travel speed of the vehicle 100 is lower than the target speed while the vehicle 100 is located on the downwardly inclined section. The aim is to control the travel speed of the vehicle 100 to follow the target speed, in view of the fact that when the vehicle 100 is located on the downwardly inclined section, greater brake pressure is required to reduce the same amount of speed than when the vehicle 100 is located on a flat section. That is, brake pressure when the vehicle 100 is located on the downwardly inclined section may be controlled to be greater than brake pressure when the vehicle 100 is located on the flat section, by an offset.

FIG. 4 (a) illustrates that a command to start an autonomous parking operation is received from a user over a time interval from t1 to t8. In FIG. 4 (b), the solid line shows the target speed of the vehicle 100, and the dotted line shows a change in the travel speed of the vehicle 100. FIG. 4 (c) illustrates a change in brake pressure of the brake 120, FIG. 4 (d) illustrates a change in clutch torque, and FIG. 4 (e) illustrates a change in the temperature of the clutch.

Over a first time interval from t0 to t1, the vehicle 100 is controlled to remain in a stop state. Accordingly, over the first time interval, the clutch torque may be controlled substantially close to zero, and the brake pressure may be controlled to the first level. Over a second time interval from t1 to t2, the controller 130 may set the target speed and may control the dual clutch transmission 110 and the brake 120 to allow the travel speed of the vehicle 100 to follow the target speed, in a response to the command to start the autonomous parking operation, which is received from the user.

The controller 130 may control the dual clutch transmission 110 to increase the clutch torque when the travel speed of the vehicle 100 is lower than the target speed and may control the dual clutch transmission 110 to decrease the clutch torque when the travel speed of the vehicle 100 is higher than or equal to the target speed. For example, the controller 130 may control the dual clutch transmission 110 to increase the clutch torque and may control the brake 120 to decrease the brake pressure by the third level. Here, the third level may be lower than the first level and higher than the second level. However, the third level is not limited thereto and may be differently set according to design.

Over a third time interval from t2 to t3, the controller 130 may control the brake 120 to release the brake pressure. Furthermore, the controller 130 may control the dual clutch transmission 110 to increase the clutch torque and may then control the dual clutch transmission 110 to decrease the clutch torque if a difference between the travel speed of the vehicle 100 and the target speed is less than a threshold value.

Over a fourth time interval from t3 to t4, the travel speed of the vehicle 100 may exceed the target speed. Over a fifth time interval from t4 to t5, the controller 130 may control the brake 120 to increase the brake pressure by the second level. Accordingly, over a sixth time interval from t5 to t6, the travel speed of the vehicle 100 may decrease. Over a seventh time interval from t6 to t7, the travel speed of the vehicle 100 may decrease below the target speed again. In the instant case, the controller 130 may control the dual clutch transmission 110 to increase the clutch torque and may then control the dual clutch transmission 110 to decrease the clutch torque if a difference between the travel speed of the vehicle 100 and the target speed is less than the threshold value.

Over an eighth time interval from t7 to t8, the travel speed of the vehicle 100 may be the same as or substantially the same as the target speed. Over a ninth time interval from t8 to t9, the controller 130 may control the dual clutch transmission 110 to decrease the clutch torque and may control the brake 120 to increase the brake pressure, in the case where the target speed of the vehicle 100 is set to zero (e.g., in the case where the vehicle 100 is completely parked and stopped). For example, to reduce the travel speed of the vehicle 100, the controller 130 may control the brake 120 to increase the brake pressure by the third level and may control the dual clutch transmission 110 to release the clutch torque (that is, to adjust the clutch torque to zero). Furthermore, the controller 130 may release the clutch torque when the vehicle 100 stops (that is, when the travel speed of the vehicle 100 is reduced to zero).

Referring again to FIG. 1, the controller 130 may control the dual clutch transmission 110 to generate a second additional torque when the travel speed of the vehicle 100 decrease in a section where the clutch torque of the dual clutch 111 is greater than or equal to a predetermined value (e.g., in the case where the travel speed of the vehicle 100 is reduced by a speed bump).

The parking space search device 140 may search for a parking space for parking the vehicle 100. For example, the parking space search device 140 may search for a parking space by use of detection information obtained through a radar detector, a LIDAR detector, or the like.

The parking path generator 150 may generate a moving path for parking the vehicle 100 in a parking space, in consideration of the location of the vehicle 100 and the location of a discovered parking space.

The location recognition device 160 may identify the current location of the vehicle 100. For example, the location recognition device 160 may identify the current location of the vehicle 100 by use of a Global Positioning System (GPS) detector.

Since the vehicle 100 performs an autonomous parking operation without any driver intervention, the dual clutch transmission 110 may control clutch torque such that the speed of the vehicle 100 follows a creep driving speed. Meanwhile, a target speed set for the autonomous parking operation of the vehicle 100 may be lower than the creep driving speed, and the travel speed of the vehicle 100 may be controlled by the brake 120 to follow the target speed. At the present time, the dual clutch transmission 110 may continually increase the clutch torque irrespective of the operation of the brake 120 to allow the travel speed of the vehicle 100 to follow the creep driving speed, and therefore frictional heat may be generated between the dual clutch 111 and the engine. However, the controller 130 of the vehicle 100 according to an exemplary embodiment of the present invention may control the dual clutch transmission 110 and the brake 120 to allow the travel speed of the vehicle 100 to follow the target speed, decreasing heat generated by the dual clutch 111. Accordingly, durability of the vehicle 100 may be improved, and merchantability of the vehicle 100 having an autonomous parking function may be improved.

Figure 5:
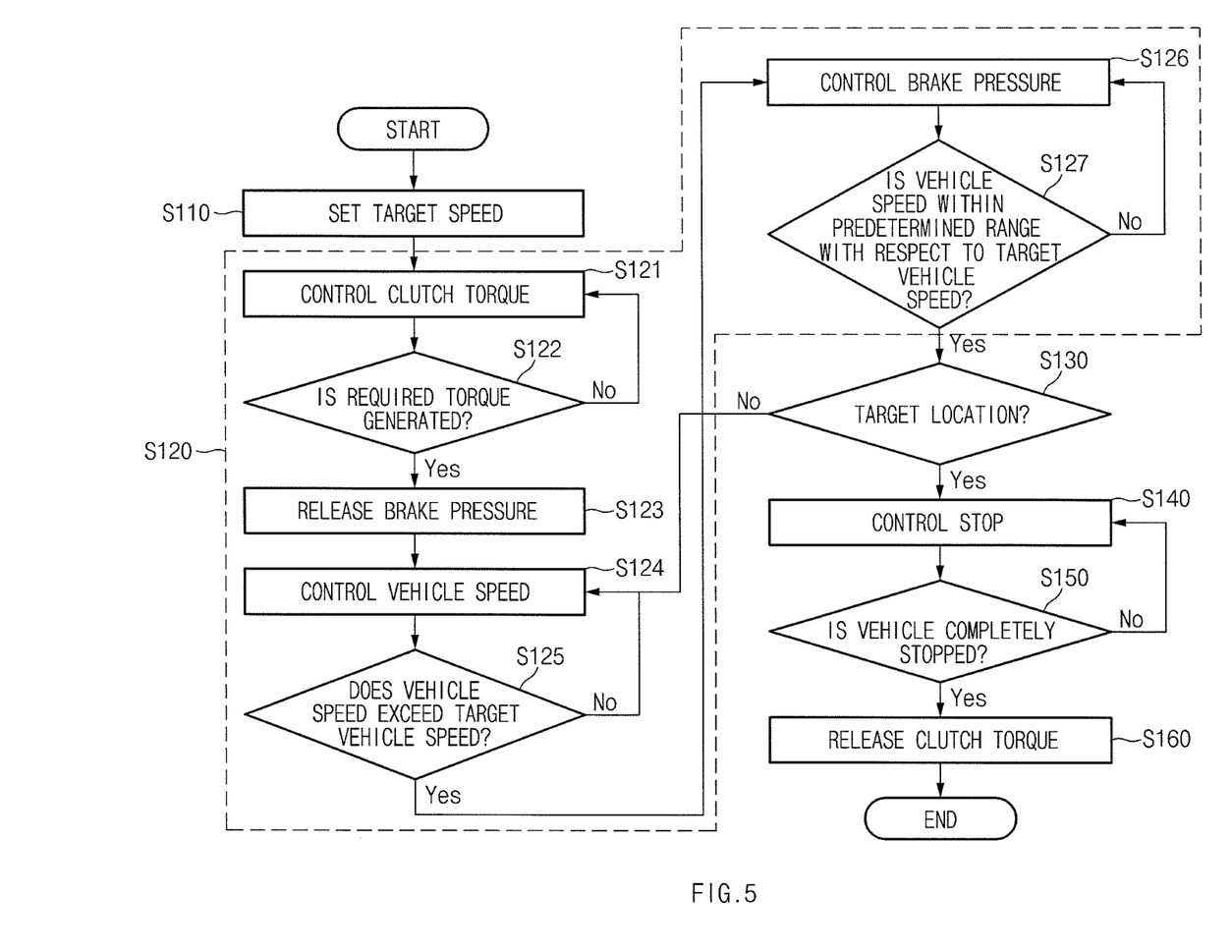
FIG. 5 is a flowchart illustrating a vehicle speed control method according to an exemplary embodiment of the present invention.

FIG. 5 is a flowchart illustrating a vehicle speed control method according to an exemplary embodiment of the present invention.

Referring to FIG. 5, a vehicle speed control method according to an exemplary embodiment of the present invention may include a step of setting a target speed of a vehicle (Step S110), a step of controlling clutch torque and brake pressure (Step S120), a step of determining whether the vehicle reaches a target location (Step S130), a step of controlling stop of the vehicle when the vehicle reaches the target location (Step S140), a step of determining whether the vehicle is completely stopped (Step S150), and a step of releasing the clutch torque when the vehicle is completely stopped (Step S160).

Step S120 may include a step of controlling the clutch torque (Step S121), a step of determining whether a required torque is generated (Step S122), a step of releasing the brake pressure when the required torque is generated (Step S123), a step of controlling a vehicle speed (Step S124), a step of determining whether the vehicle speed exceeds the target vehicle speed (Step S125), a step of controlling the brake pressure when the vehicle speed exceeds the target vehicle speed (Step S126), and a step of determining whether the travel speed of the vehicle is within a predetermined range with respect to the target vehicle speed (Step S127).

Hereinafter, Steps S110 to S160 will be described in more detail with reference to FIGS. 1 to 4.

In step S110, the controller 130 may set a target speed of the vehicle 100.

In step S121, the controller 130 may control the dual clutch transmission 110 to increase clutch torque.

In step S122, the controller 130 may determine whether a clutch torque (e.g., a first additional torque) required to control the travel speed of the vehicle 100 to follow the target speed is generated (see the second time interval of FIG. 3).

In step S123, the controller 130 may control the brake 120 to release brake pressure when it is determined that the required clutch torque is generated.

In step S124, the controller 130 may control a vehicle speed by controlling the dual clutch transmission 110 while the brake pressure is released.

In step S125, the controller 130 may determine whether the travel speed of the vehicle 100 exceeds the target vehicle speed.

In step S126, the controller 130 may control the brake 120 to increase the brake pressure when it is determined that the travel speed of the vehicle 100 exceeds the target vehicle speed.

In step S127, the controller 130 may determine whether the travel speed of the vehicle 100 is within a predetermined range with respect to the target vehicle speed. The controller 130 may control the dual clutch transmission 110 to maintain or decrease the clutch torque when it is determined that the travel speed of the vehicle 100 is within the predetermined range with respect to the target vehicle speed.

In step S130, the controller 130 may determine whether the vehicle 100 is located in a target location. For example, the target location may be a discovered parking space for the vehicle 100.

In step S140, the controller 130 may increase the brake pressure when it is determined that the vehicle 100 is located in the target location.

In step S150, the controller 130 may determine whether the vehicle 100 is stopped.

In step S160, the controller 130 may control the dual clutch transmission 110 to release the clutch torque when it is determined that the vehicle 100 is stopped.

Figure 6:
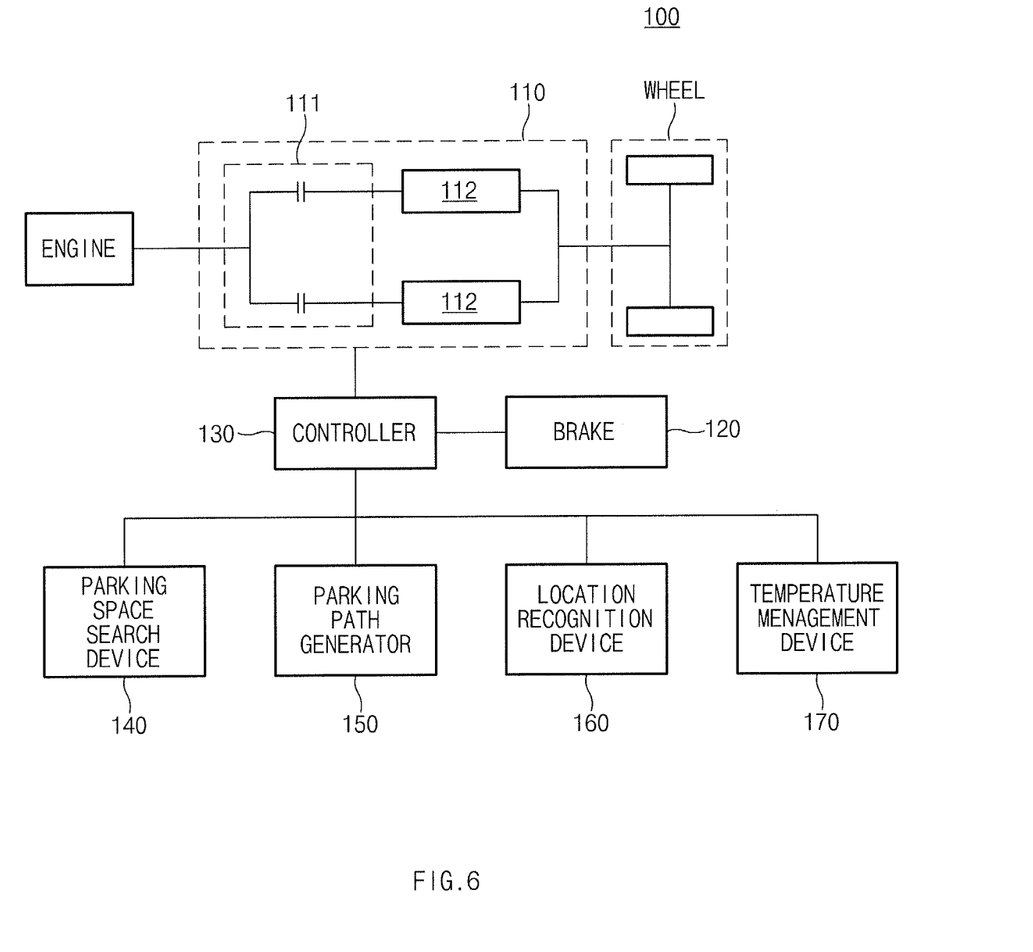
FIG. 6 illustrates a vehicle according to another exemplary embodiment of the present invention.

FIG. 6 illustrates a vehicle according to another exemplary embodiment of the present invention.

Referring to FIG. 6, the vehicle 100 according to another exemplary embodiment of the present invention differs from the vehicle 100 illustrated in FIG. 1 in that the former may further include a temperature management device 170.

The temperature management device 170 may manage the temperature of the dual clutch transmission 110. For example, in the case where the dual clutch transmission 110 is of a wet type, the dual clutch transmission 110 may be cooled by coolant when the temperature of the dual clutch transmission 110 is higher than or equal to a threshold temperature. Alternatively, in the case where the dual clutch transmission 110 is of a dry type, the temperature management device 170 may inform the controller 130 that vehicle speed control for an autonomous parking operation is impossible, preventing the dual clutch 111 from being worn down.

Figure 7:
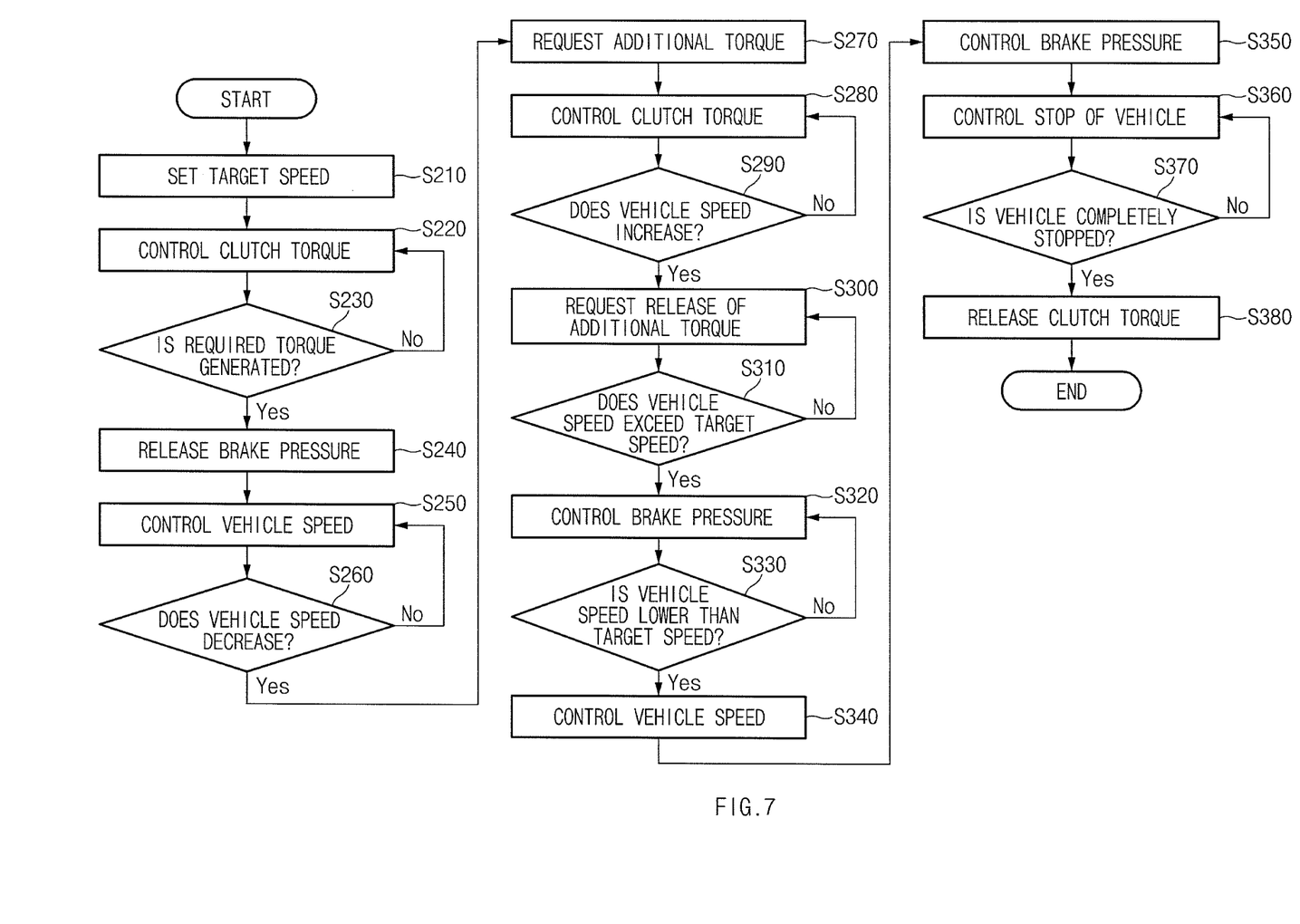
FIG. 7 is a flowchart illustrating a vehicle speed control method according to another exemplary embodiment of the present invention.
Figure 8:
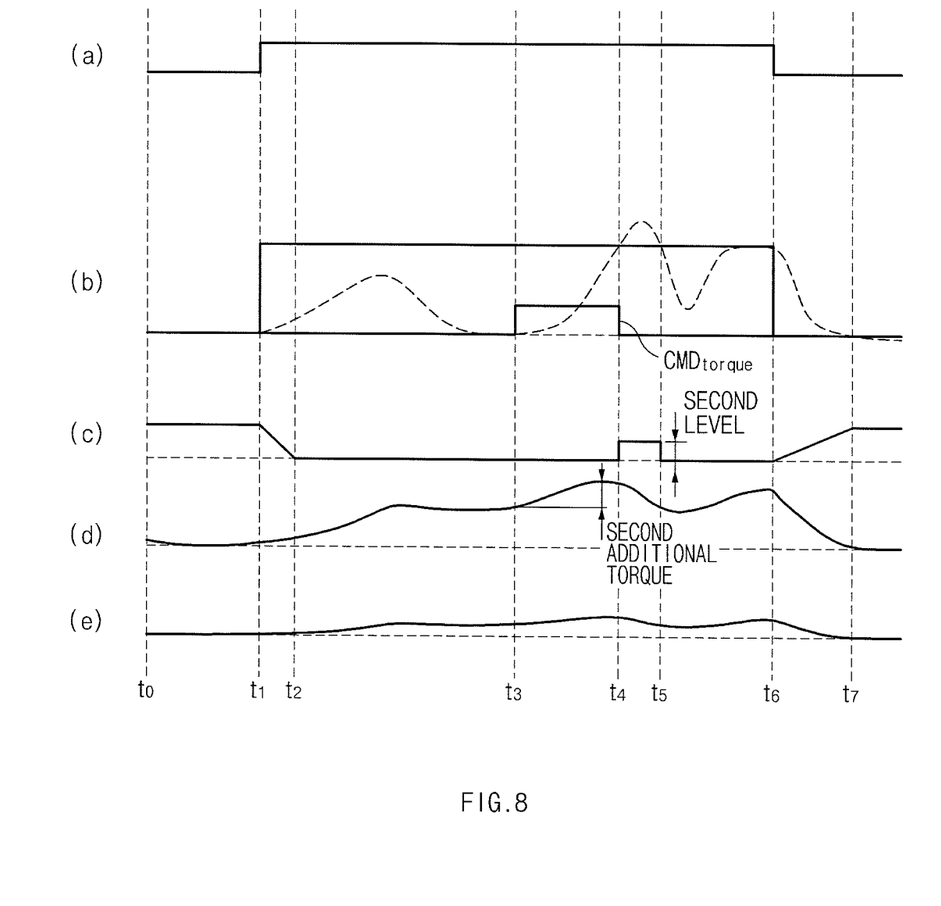
FIG. 8 illustrates a graph for explaining the vehicle speed control method according to the other embodiment of the present invention.

FIG. 7 is a flowchart illustrating a vehicle speed control method according to another exemplary embodiment of the present invention. FIG. 8 illustrates a graph for explaining the vehicle speed control method according to the other embodiment of the present invention.

FIG. 8 (a) illustrates that a command to start an autonomous parking operation is received from a user over a time interval from t1 to t8. In FIG. 8 (b), the solid line shows a target speed of the vehicle 100, and the dotted line shows a change in the travel speed of the vehicle 100. FIG. 8 (c) illustrates a change in brake pressure of the brake 120, FIG. 8 (d) illustrates a change in clutch torque, and FIG. 8 (e) illustrates a change in the temperature of the clutch. Over a first time interval from t0 to t1, the vehicle 100 is controlled to remain in a stop state. Accordingly, over the first time interval, the clutch torque may be controlled substantially close to zero, and the brake pressure may be controlled to a first level.

Referring to FIGS. 7 and 8, in step S210, the controller 130 may set the target speed of the vehicle 100.

In step S220, the controller 130 may control the dual clutch transmission 110 to increase the clutch torque. Over a second time interval from t1 to t2 in FIG. 8, the controller 130 may control the dual clutch transmission 110 to increase the clutch torque and may control the brake 120 to decrease the brake pressure by the first level.

In step S230, the controller 130 may determine whether a clutch torque required to control the travel speed of the vehicle 100 to follow the target speed is generated. For example, over the second time interval from t1 to t2, the controller 130 may determine whether a clutch torque required to control the travel speed of the vehicle 100 to follow the target speed is generated.

In step S240, the controller 130 may control the brake 120 to release the brake pressure when it is determined that the required clutch torque is generated. Over a third time interval from t2 to t3 in FIG. 8, the controller 130 may control the brake 120 to release the brake pressure.

In step S250, the controller 130 may control a vehicle speed by controlling the dual clutch transmission 110 while the brake pressure is released.

In step S260, the controller 130 may determine whether the travel speed of the vehicle 100 decreases. For example, over the third time interval from t2 to t3 in FIG. 8, the travel speed of the vehicle 100 may decrease while the clutch torque is greater than or equal to a predetermined value. Such a case may be, for example, when the vehicle 100 enters an upwardly inclined section of a speed bump, and the vehicle 100 may need an additional clutch torque to move over the speed bump.

In step S270, the controller 130 may request ($CMD_{torque}$) an additional clutch torque (e.g., a second additional torque) from the dual clutch transmission 110. For example, at time t3 in FIG. 8, the controller 130 may request the additional clutch torque (e.g., the second additional torque) from the dual clutch transmission 110.

In step S280, the controller 130 may control the dual clutch transmission 110 to generate an additional clutch torque. Accordingly, the travel speed of the vehicle 100 may increase over a fourth time interval from t3 to t4 in FIG. 8.

In step S290, the controller 130 may determine whether the travel speed of the vehicle 100 increases.

In step S300, the controller 130 may request the dual clutch transmission 110 to release the additional clutch torque (e.g., the second additional torque) when it is determined that the travel speed of the vehicle 100 increases. For example, at time t4 in FIG. 8, the controller 130 may request the dual clutch transmission 110 to release the additional clutch torque (e.g., the second additional torque).

In step S310, the controller 310 may determine whether the travel speed of the vehicle 100 exceeds the target speed.

In step S320, the controller 130 may control the brake 120 to increase the brake pressure when it is determined that the travel speed of the vehicle 100 exceeds the target vehicle speed. For example, over a fifth time interval from t4 to t5 in FIG. 8, the controller 130 may control the brake 120 to increase the brake pressure by a second level.

In step S330, the controller 130 may determine whether the travel speed of the vehicle 100 is lower than the target speed.

In step S340, the controller 130 may control the dual clutch transmission 110 to increase the clutch torque when the travel speed of the vehicle 100 is lower than the target speed. For example, over a sixth time interval from t5 to t6 in FIG. 8, the controller 130 may control the dual clutch transmission 110 to increase the clutch torque.

In step S350, the controller 130 may release the brake pressure.

In step S360, the controller 130 may determine whether the vehicle 100 is located in a target location. For example, the target location may be a discovered parking space for the vehicle 100. The controller 130 may increase the brake pressure of the vehicle 100 when it is determined that the vehicle 100 is located in the target location. Over a seventh time interval from t6 to t7 in FIG. 8, the controller 130 may control the brake 120 to increase the brake pressure.

In step S370, the controller 130 may determine whether the vehicle 100 is stopped.

In step S380, the controller 130 may control the dual clutch transmission 110 to release the clutch torque when it is determined that the vehicle 100 is stopped. Over the seventh time interval from t6 to t7 in FIG. 8, the controller 130 may control the dual clutch transmission 110 to release the clutch torque.

Figure 9:
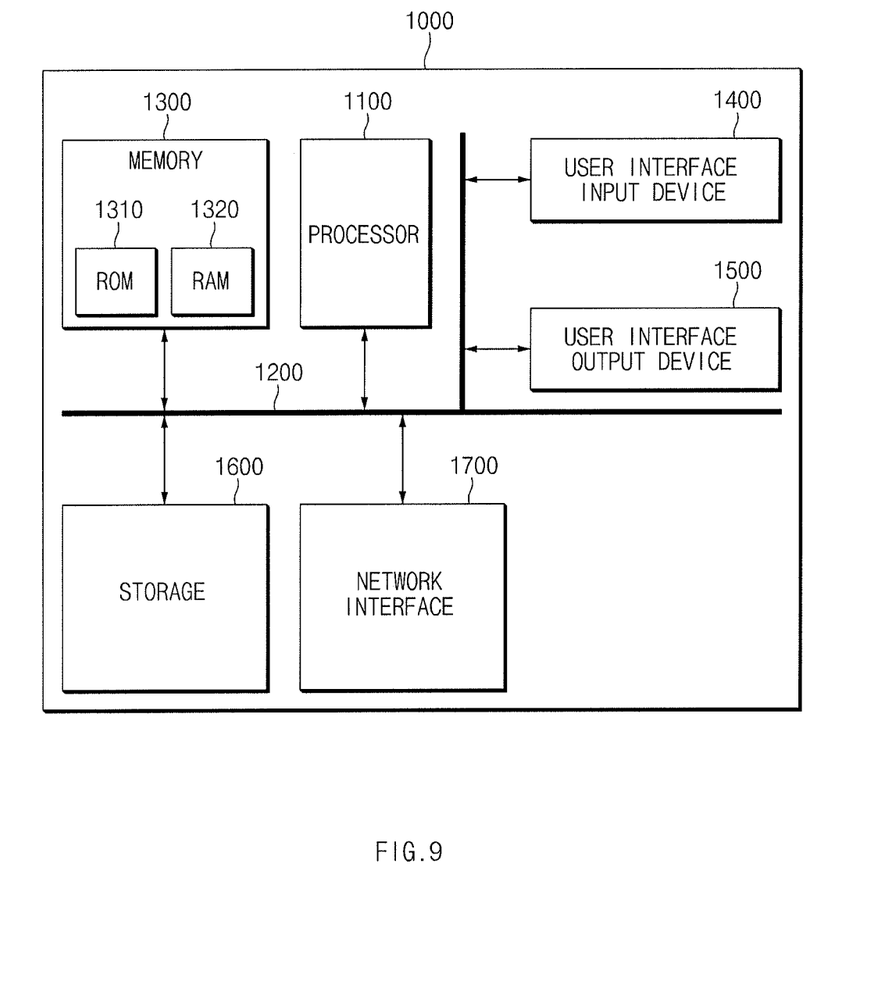
FIG. 9 illustrates a block diagram of a computing system for executing a vehicle speed control method according to an exemplary embodiment of the present invention.

FIG. 9 illustrates a block diagram of a computing system for executing a vehicle speed control method according to an exemplary embodiment of the present invention.

Referring to FIG. 9, the above-described vehicle speed control method according to an exemplary embodiment of the present invention may also be implemented through a computing system. A computing system 1000 may include at least one processor 1100, a memory 1300, a user interface input device 1400, a user interface output device 1500, storage 1600, and a network interface 1700 that are connected together through a system bus 1200.

The processor 1100 may be a semiconductor device that executes instructions stored in a central processing unit (CPU) or the memory 1300 and/or the storage 1600. The memory 1300 and the storage 1600 may include various types of volatile or non-volatile storage mediums. For example, the memory 1300 may include a read only memory (ROM) 1310 and a random access memory (RAM) 1320.

Accordingly, the steps of the method or algorithm described above in relation to the exemplary embodiments included in the present invention may be directly implemented with a hardware module or a software module executed by the processor 1100, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM. An exemplary storage medium may be coupled to the processor 1100, and the processor 1100 may read information out of the storage medium and may record information in the storage medium. In a different way, the storage medium may be integrated with the processor 1100. The processor and the storage medium may reside in an application specific integrated circuit (ASIC). The ASIC may reside in a user terminal. In a different way, the processor and the storage medium may also reside in a user terminal as separate components.

Although the present invention has been described with reference to exemplary embodiments and the accompanying drawings, the present invention is not limited thereto, but may be variously modified and altered by those skilled in the art to which the present invention pertains without departing from the spirit and scope of the present invention.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle comprising:
   a dual clutch transmission configured to adjust a travel speed of the vehicle by controlling a clutch torque to adjust a driving force of an engine, the driving force being transmitted to a wheel of the vehicle;
   a brake configured to make the vehicle slow down to reduce the travel speed of the vehicle; and
   a controller configured to set a target speed of the vehicle and to control the dual clutch transmission to adjust the clutch torque and the brake to adjust a brake pressure to allow the travel speed of the vehicle to follow the set target speed,
   wherein the target speed is defined as a speed which is lower than a creep driving speed of the vehicle while the vehicle is on autonomous parking operation.

2. The vehicle of claim 1, wherein the controller is configured to control the dual clutch transmission to increase the clutch torque when the travel speed of the vehicle is lower than the target speed and is configured to control the dual clutch transmission to decrease the clutch torque when the travel speed of the vehicle is higher than or equal to the target speed.

3. The vehicle of claim 2, wherein the brake adjusts the brake pressure to make the vehicle slow down.

4. The vehicle of claim 3, wherein the controller is configured to control the brake to decrease the brake pressure by a first level when the travel speed of the vehicle is lower than the target speed and is configured to control the brake to increase the brake pressure by a second level when the travel speed of the vehicle is higher than or equal to the target speed.

5. The vehicle of claim 4, wherein the controller is configured to control the brake to decrease the brake pressure by a third level lower than the first level when the travel speed of the vehicle is lower than the target speed while the vehicle is located on a downwardly inclined section.

6. The vehicle of claim 1, wherein the controller is configured to control the dual clutch transmission to generate a first additional torque when the vehicle is located on an upwardly inclined section.

7. The vehicle of claim 6, wherein the controller is configured to control the brake to decrease the brake pressure until the clutch torque increases to reach the first additional torque or more when the vehicle is located on the upwardly inclined section and is configured to control the brake to release the brake pressure when the clutch torque is greater than or equal to the first additional torque.

8. The vehicle of claim 1, wherein the controller is configured to control the dual clutch transmission to decrease the clutch torque and is configured to control the brake to increase the brake pressure when the target speed of the vehicle is set to zero.

9. The vehicle of claim 1, wherein the controller is configured to control the dual clutch transmission to generate a second additional torque when the travel speed of the vehicle decreases in a section where the clutch torque is greater than or equal to a predetermined value.

10. A method for controlling a speed of a vehicle, the method comprising:

setting a target speed of the vehicle; and controlling a dual clutch transmission to adjust a clutch torque and a brake to adjust a brake pressure to allow a travel speed of the vehicle to follow the target speed, based on the set target speed, wherein the target speed is defined as a speed which is lower than a creep driving speed of the vehicle while the vehicle is on autonomous parking operation, wherein the dual clutch transmission is configured to adjust the travel speed of the vehicle by controlling the clutch torque to adjust a driving force of an engine, the driving force being transmitted to a wheel of the vehicle.

11. The method of claim 10, wherein the controlling of the dual clutch transmission and the brake includes:

controlling the dual clutch transmission to increase the clutch torque when the travel speed of the vehicle is lower than the target speed; and controlling the dual clutch transmission to decrease the clutch torque when the travel speed of the vehicle is higher than or equal to the target speed.

12. The method of claim 11, wherein the brake adjusts the brake pressure to make the vehicle slow down.

13. The method of claim 12, wherein the controlling of the dual clutch transmission and the brake further includes:

controlling the brake to decrease the brake pressure by a first level when the travel speed of the vehicle is lower than the target speed; and controlling the brake to increase the brake pressure by a second level when the travel speed of the vehicle is higher than or equal to the target speed.

14. The method of claim 13, wherein the controlling of the dual clutch transmission and the brake further includes:

controlling the brake to decrease the brake pressure by a third level lower than the first level when the travel speed of the vehicle is lower than the target speed while the vehicle is located on a downwardly inclined section.

15. The method of claim 10, wherein the controlling of the dual clutch transmission and the brake includes:

controlling the dual clutch transmission to generate a first additional torque when the vehicle is located on an upwardly inclined section.

16. The method of claim 15, wherein the controlling of the dual clutch transmission and the brake further includes:

controlling the brake to decrease the brake pressure until the clutch torque increases to reach the first additional torque or more when the vehicle is located on the upwardly inclined section; and controlling the brake to release the brake pressure when the clutch torque is greater than or equal to the first additional torque.

17. The method of claim 10, wherein the controlling of the dual clutch transmission and the brake includes:

controlling the dual clutch transmission to decrease the clutch torque and controlling the brake to increase the brake pressure when the target speed of the vehicle is set to zero.

18. The method of claim 10, wherein the controlling of the dual clutch transmission and the brake includes:

controlling the dual clutch transmission to generate a second additional torque when the travel speed of the vehicle decreases in a section where the clutch torque is greater than or equal to a predetermined value.

* * * * *